(12) United States Patent
Raindel et al.

(10) Patent No.: US 8,914,458 B2
(45) Date of Patent: Dec. 16, 2014

(54) LOOK-AHEAD HANDLING OF PAGE FAULTS IN I/O OPERATIONS

(71) Applicant: Mellanox Technologies Ltd., Yokneam (IL)

(72) Inventors: Shachar Raindel, Haifa (IL); Haggai Eran, Yokneam Illit (IL); Liran Liss, Atzmon (IL); Noam Bloch, Bat Shlomo (NL)

(73) Assignee: Mellanox Technologies Ltd., Yokneam (IL)

( * ) Notice: Subject to any disclaimer, the term of this patent is extended or adjusted under 35 U.S.C. 154(b) by 161 days.

(21) Appl. No.: 13/628,075

(22) Filed: Sep. 27, 2012

(65) Prior Publication Data

US 2014/0089450 A1 Mar. 27, 2014

(51) Int. Cl.
*G06F 15/167* (2006.01)
(52) U.S. Cl.
USPC ........... 709/213; 709/212; 709/214; 709/216; 710/2; 710/4; 710/5; 710/36; 71/147
(58) Field of Classification Search
CPC ....... G06F 3/01; G06F 3/0655; G06F 3/0658; G06F 3/0659; G06F 9/265; G05B 2219/35376; G11C 7/10; G11C 11/4096; G11C 11/4093
USPC ........ 710/2, 4, 5, 36; 709/212, 213, 214, 216; 711/147
See application file for complete search history.

(56) References Cited

U.S. PATENT DOCUMENTS

| | | | |
|---|---|---|---|
| 5,822,749 A | 10/1998 | Agarwal | |
| 5,845,329 A * | 12/1998 | Onishi et al. | 711/157 |
| 6,321,276 B1 | 11/2001 | Forin | |
| 6,629,166 B1 * | 9/2003 | Grun | 710/36 |
| 6,766,467 B1 | 7/2004 | Neal et al. | |
| 6,789,143 B2 | 9/2004 | Craddock et al. | |
| 6,981,027 B1 | 12/2005 | Gallo et al. | |
| 7,171,484 B1 * | 1/2007 | Krause et al. | 709/232 |
| 7,263,103 B2 | 8/2007 | Kagan et al. | |
| 7,299,266 B2 | 11/2007 | Boyd et al. | |
| 7,464,198 B2 | 12/2008 | Martinez et al. | |
| 7,475,398 B2 | 1/2009 | Nunoe | |
| 7,548,999 B2 | 6/2009 | Haertel et al. | |
| 7,721,068 B2 * | 5/2010 | Lowe et al. | 711/206 |

(Continued)

OTHER PUBLICATIONS

U.S. Appl. No. 13/628,187 Office Action dated Sep. 19, 2013.

(Continued)

*Primary Examiner* — Thu Ha Nguyen
(74) *Attorney, Agent, or Firm* — D. Kligler I.P. Services Ltd.

(57) ABSTRACT

A method for data transfer includes receiving in an input/output (I/O) operation a first segment of data to be written to a specified virtual address in a host memory. Upon receiving the first segment of the data, it is detected that a first page that contains the specified virtual address is swapped out of the host memory. At least one second page of the host memory is identified, to which a second segment of the data is expected to be written. Responsively to detecting that the first page is swapped out and to identifying the at least one second page, at least the first and second pages are swapped into the host memory. After swapping at least the first and second pages into the host memory, the data are written to the first and second pages.

29 Claims, 4 Drawing Sheets

(56) References Cited

U.S. PATENT DOCUMENTS

| | | | |
|---|---|---|---|
| 7,752,417 B2 | 7/2010 | Manczak et al. | |
| 7,809,923 B2 * | 10/2010 | Hummel et al. | 711/207 |
| 7,844,746 B2 * | 11/2010 | Arimilli et al. | 710/5 |
| 8,001,592 B2 | 8/2011 | Hatakeyama | |
| 8,010,763 B2 | 8/2011 | Armstrong et al. | |
| 8,051,212 B2 | 11/2011 | Kagan et al. | |
| 8,086,765 B2 * | 12/2011 | Turner et al. | 710/22 |
| 8,255,475 B2 | 8/2012 | Kagan et al. | |
| 8,364,910 B2 * | 1/2013 | Wilkerson et al. | 711/152 |
| 8,447,904 B2 | 5/2013 | Riddoch | |
| 8,745,276 B2 * | 6/2014 | Bloch et al. | 710/4 |
| 2002/0152327 A1 | 10/2002 | Kagan et al. | |
| 2003/0046530 A1 | 3/2003 | Poznanovic | |
| 2004/0107304 A1 * | 6/2004 | Grun | 710/36 |
| 2004/0221128 A1 | 11/2004 | Beecroft et al. | |
| 2004/0230979 A1 | 11/2004 | Beecroft et al. | |
| 2007/0011429 A1 | 1/2007 | Sangili et al. | |
| 2007/0061492 A1 | 3/2007 | Van Riel | |
| 2007/0157001 A1 * | 7/2007 | Ritzau | 711/170 |
| 2007/0157011 A1 * | 7/2007 | Kumar et al. | 713/1 |
| 2008/0005495 A1 * | 1/2008 | Lowe et al. | 711/152 |
| 2008/0133709 A1 * | 6/2008 | Aloni et al. | 709/218 |
| 2008/0222397 A1 * | 9/2008 | Wilkerson et al. | 712/220 |
| 2010/0077397 A1 | 3/2010 | Ooi et al. | |
| 2010/0095085 A1 | 4/2010 | Hummel et al. | |
| 2011/0023027 A1 | 1/2011 | Kegel et al. | |
| 2012/0317122 A1 * | 12/2012 | Baptist et al. | 707/741 |
| 2013/0145085 A1 * | 6/2013 | Yu et al. | 711/103 |
| 2014/0164716 A1 * | 6/2014 | Glasco et al. | 711/147 |

OTHER PUBLICATIONS

U.S. Appl. No. 13/229,772 Notice of Allowance dated Oct. 4, 2013.
Raindel et al., U.S. Appl. No. 13/471,558, filed May 15, 2012.
Kagan et al., U.S. Appl. No. 13/665,946, filed Nov. 1, 2012.
Solomon R., "IOV 1:1 Update and Overview", LSI Corporation, Member I/O Virtualization Workgroup, PCI-SIG, PCI Express, 45 pages, 2010.
Hummel M., "IO Memory Management Hardware Goes Mainstream", AMD Fellow, Computation Products Group, Microsoft WinHEC, 7 pages, 2006.
Welsh et al., "Incorporating Memory Management into User-Level Network Interfaces", Department of Computer Science, Cornell University, Technical Report TR97-1620, 10 pages, Feb. 13, 1997.
"Linux kernel enable the IOMMU—input/output memory management unit support", Oct. 15, 2007 http://www.cyberciti.biz/tips/howto-turn-on-linux-software-iommu-support.html.
U.S. Appl. No. 12/430,912 Office Action dated Jun. 15, 2011.
U.S. Appl. No. 12/430,912 Office Action dated Nov. 2, 2011.
U.S. Appl. No. 13/229,772, filed Sep. 12, 2011.
Infiniband Trade Association, "InfiniBandTM Architecture Specification", vol. 1, Release 1.2.1, Nov. 2007.
Shah et al., "Direct Data Placement over Reliable Transports", IETF Network Working Group, RFC 5041, Oct. 2007.
Culley et al., "Marker PDU Aligned Framing for TCP Specification", IETF Network Working Group, RFC 5044, Oct. 2007.
"MPI: A Message-Passing Interface Standard", Version 2.2, Message Passing Interface Forum, Sep. 4, 2009.
U.S. Appl. No. 13/628,155, filed Sep. 27, 2012.
U.S. Appl. No. 13/628,187, filed Sep. 27, 2012.
U.S. Appl. No. 13/628,155 Office Action dated Sep. 5, 2014.

* cited by examiner

LOOK-AHEAD HANDLING OF PAGE FAULTS IN I/O OPERATIONS

CROSS-REFERENCE TO RELATED APPLICATION

This application is related to two other U.S. patent applications, filed on even date, entitled "Use of Free Pages in Handling Page Faults" and "Application-Assisted Handling of Page Faults in I/O Operations," which are incorporated herein by reference.

FIELD OF THE INVENTION

The present invention relates generally to computer systems, and specifically to handling of input/output (I/O) operations.

BACKGROUND

Computer operating systems use virtual memory techniques to permit application programs to address a contiguous working memory space, even when the corresponding physical (machine) memory space is fragmented and may overflow to disk storage. The virtual memory address space is typically divided into pages, and the computer memory management unit (MMU) uses page tables to translate the virtual addresses of the application program into physical addresses. The virtual address range may exceed the amount of actual physical memory, in which case disk storage space is used to save ("swap out") virtual memory pages that are not currently active. When an application attempts to access a virtual address that is absent from the physical memory, the MMU raises a page fault exception (commonly referred to simply as a "page fault"), which causes the operating system to swap the required page back from the disk into the memory. Other uses of page faults in memory management are also known in the art.

I/O devices usually use physical memory addresses in order to access host memory, but some virtual memory addressing techniques for I/O have been developed. For example, the PCI-SIG organization (Beaverton, Oreg.) has developed a set of I/O Virtualization (IOV) specifications. The PCI-SIG Address Translation Services (ATS) specifications, including ATS 1.0 and 1.1, provide a set of transactions for PCI Express components to exchange and use translated addresses in support of native I/O Virtualization. These specifications can be used in conjunction with system virtualization technologies to allow multiple operating systems running simultaneously within a single computer to natively share PCI Express® devices.

Welsh et al., in a paper entitled, "Incorporating memory Management into User-Level Network Interfaces" (Department of Computer Science, Cornell University, Technical Report TR97-1620, Feb. 13, 1997), describe an architecture in which a network interface (NI) performs address translation between physical and virtual address spaces. The paper presents an extension to the U-Net user-level network architecture (U-Net/MM) that allows messages to be transferred directly to and from any part of the address space of an application. This capability is achieved by integrating a translation look-aside buffer into the network interface and coordinating its operation with the virtual memory subsystem of the computer operating system. This mechanism is said to allow network buffer pages to be pinned and unpinned dynamically.

Some virtual memory addressing techniques for I/O have been described in the patent literature. For example, U.S. Pat. No. 6,321,276, whose disclosure is incorporated herein by reference, describes methods and systems for processing input/output requests including virtual memory addresses. A "recoverable I/O request processor" translates virtual memory addresses to physical memory addresses utilizing translation tables local to an I/O device. If a local translation fails, the I/O request processor requests virtual address mapping information from the operating system.

U.S. Patent Application Publication 2004/0221128, whose disclosure is incorporated herein by reference, describes virtual-to-physical memory mapping in network interfaces. A plurality of processing nodes in a network have respective addressable memories and respective network interfaces. Each network interface includes a memory management unit with at least one mapping table for mapping virtual addresses to the physical addresses of the addressable memory of the respective processing node.

U.S. Pat. No. 8,255,475, whose disclosure is incorporated herein by reference, describes an input/output (I/O) device that includes a host interface, for connection to a host device having a memory, and a network interface, which is configured to receive, over a network, data packets associated with I/O operations directed to specified virtual addresses in the memory. Packet processing hardware is configured to translate the virtual addresses into physical addresses and to perform the I/O operations using the physical addresses. Upon an occurrence of a page fault in translating one of the virtual addresses, the I/O device transmits a response packet over the network to a source of the data packets so as to cause the source to refrain from transmitting further data packets while the page fault is serviced.

SUMMARY

Embodiments of the present invention that are described hereinbelow provide devices and methods for improved I/O memory management.

There is therefore provided, in accordance with an embodiment of the present invention, a method for data transfer, which includes receiving in an input/output (I/O) operation a first segment of data to be written to a specified virtual address in a host memory. Upon receiving the first segment of the data, it is detected that a first page that contains the specified virtual address is swapped out of the host memory. At least one second page of the host memory is identified, to which a second segment of the data is expected to be written. Responsively to detecting that the first page is swapped out and to identifying the at least one second page, at least the first and second pages are swapped into the host memory. After swapping at least the first and second pages into the host memory, the data are written to the first and second pages.

In a disclosed embodiment, identifying the at least one second page includes detecting that the at least one second page will be required before the second segment of the data is received in the I/O operation. Receiving the first and second segments of the data may include receiving first and second data packets over a network.

In some embodiments, detecting that the first page is swapped out includes generating a page fault event, wherein at least the first and second pages are swapped into the host memory in response to the page fault event. The method may include pausing the I/O operation in response to the page fault event, until at least the first page has been swapped into the host memory.

In disclosed embodiments, the I/O operation includes a message directed to a message queue in the host memory, and identifying the at least one second page includes applying information from the message queue in identifying the at least one second page.

There is also provided, in accordance with an embodiment of the present invention, a method for data transfer, which includes receiving multiple data packets in a network interface controller (NIC) coupled to a host processor, the data packets including at least first and second packets respectively containing first and second data directed to respective first and second virtual addresses in a memory of the host processor. While processing the first data in the NIC and before processing the second data from the second packet, it is detected that a first page containing the first virtual address and a second page containing the second virtual address are swapped out of the memory. Responsively to detecting that the first and second pages are swapped out of the memory, both the first and second pages are swapped into the host memory before processing the second data from the second packet. After swapping the first and second pages into the host memory, the first and second data are written to the first and second pages.

In some embodiments, the first and second data packets contain respective parts of a message directed to a message queue of the NIC, and detecting that the second page is swapped out of the memory includes applying information from the message queue in identifying the second page. Applying the information from the message queue may include reading virtual address information from work items in a receive queue of the NIC.

Additionally or alternatively, the first and second data packets may contain respective parts of a remote direct memory access (RDMA) message, and detecting that the second page is swapped out of the memory may include reading a header of the RDMA message from the first packet in order to identify both the first and second pages.

Further additionally or alternatively, receiving the multiple data packets includes placing at least the first and second packets in an input buffer of the NIC, and detecting that the second page containing the second virtual address is swapped out of the memory includes processing a header of the second packet in the input buffer in order to identify the second virtual address.

There is additionally provided, in accordance with an embodiment of the present invention, input/output (I/O) apparatus, including a host interface for connection to a host processor having a host memory and running an operating system. Processing circuitry is configured to receive in an I/O operation a first segment of data to be written to a specified virtual address in the host memory, to detect, upon receiving the first segment of the data, that a first page that contains the specified virtual address is swapped out of the host memory, to identify at least one second page of the host memory to which a second segment of the data is expected to be written, and responsively to detecting that the first page is swapped out and to identifying the at least one second page, to cause the operating system to swap at least the first and second pages into the host memory, and after at least the first and second pages have been swapped into the host memory, to write the data to the first and second pages.

There is further provided, in accordance with an embodiment of the present invention, a network interface controller (NIC), including a host interface for connection to a host processor having a host memory and running an operating system. A network interface is configured to receive multiple data packets from a network, including at least first and second packets respectively containing first and second data directed to respective first and second virtual addresses in the host memory. Processing circuitry is configured to process the data packets so as to detect, while processing the first data from the first packet and before processing the second data from the second packet, that a first page containing the first virtual address and a second page containing the second virtual address are swapped out of the memory. The processing circuitry is configured, responsively to detecting that the first and second pages are swapped out of the memory and before processing the second data from the second packet, to cause the operating system to swap both the first and second pages into the host memory, and to write the first and second data to the first and second pages after the first and second pages have been swapped into the host memory.

The present invention will be more fully understood from the following detailed description of the embodiments thereof, taken together with the drawings in which:

DETAILED DESCRIPTION OF EMBODIMENTS

Overview

When a page fault occurs in a software process running on a host central processing unit (CPU), the process typically stops at the instruction that caused the page fault (after completing all prior instructions). The process is suspended until the appropriate page of virtual memory has been swapped into memory, and then resumes its operation. While the suspended process waits for the page fault to be serviced, other processes may continue execution.

This sort of approach may not be appropriate, however, for high-speed, multi-channel I/O devices, such as a network interface controller (NIC) connecting a CPU to a high-speed switch fabric. Unlike the CPU, the NIC does not control the execution of its operations, since the NIC will typically continue to receive incoming packets from the network while waiting for the page swap. If the NIC suspends processing of packets on a given channel until the page fault has been serviced, it must either buffer these packets, meaning that a large buffer is required at the input side of the NIC, or drop them, which will lead to transport or application protocol faults. While execution is suspended to allow the page swap on the given channel, the NIC may still need to deal with reception and transmission of packets on other channels. For these reasons, NICs (and most other I/O devices) that are known in the art typically used "pinned" memory, in which a range of physical memory is pre-assigned to the NIC, or possibly pre-assigned to a client, such as an application process, that communicates with the NIC, and page faults are thus avoided.

Embodiments of the present invention that are described hereinbelow provide devices and methods for I/O memory management that are compatible with and facilitate the use of virtual memory. In some embodiments, an I/O device, such as a NIC, is configured to send and receive, over network transport connections, data packets associated with I/O operations that are directed to specified virtual addresses in a host memory. A virtual address range is defined in advance for each such transport connection. The corresponding range of physical addresses need not be pinned. It is thus possible to define multiple transport instances, each with its own virtual address range, wherein the total allocation of virtual memory addresses may exceed the available physical memory space. The I/O device typically operates on the fly and has only minimal internal buffer space of its own. In some embodiments, even this buffer space is simply allocated in the host memory and is not necessarily pinned.

Packet processing hardware in the I/O device translates the virtual addresses into physical addresses and carries out the I/O operations using the physical addresses. When a page fault occurs, processing of the transport service instance in question is delayed until the appropriate page has been swapped into the host memory. In a read operation from a virtual address in the host memory, the operation may be delayed without data loss, since in this case the data are inherently already buffered by the host. On the other hand, when a page fault occurs in a write operation directed to a virtual address in the host memory, the I/O device cannot generally buffer the incoming data packets while waiting for the page swap. Furthermore, accumulation of packets in the input buffer will cause back-pressure on the network link connecting to the I/O device, leading to congestion that may propagate back throughout the network.

To avoid transport faults and congestion in this latter sort of situation, the I/O device may transmit a response packet over the transport connection in question to the source of the data packets, instructing the source to refrain from transmitting further data packets while the page fault is serviced. This sort of approach is described in the above-mentioned U.S. Pat. No. 8,255,475, for example.

Additionally or alternatively, the I/O device may interact with the host operating system (OS), and possibly with user application programs running on the host, in order to minimize delay in handling the present page fault and/or avoid page faults in subsequent I/O operations. For example, in some embodiments, when a page of virtual memory containing a requested address is not available in physical memory, the I/O device may write the data to a free page of physical memory. This page may then subsequently be mapped to the virtual address to which the data were originally to have been written. Identification of free pages for this purpose may be facilitated by enabling user applications to flag memory pages containing data that they no longer need, which may then be overwritten. Additionally or alternatively, an application may post a work item in the queue of the I/O device (such as a work queue element [WQEs] in a receive queue of a NIC) instructing the I/O device to request allocation of a free page, to be mapped to a specified virtual address after received data have been written to the page.

Further additionally or alternatively, user applications may be programmed to indicate to the OS that certain pages of virtual memory will shortly be required for reception of incoming I/O data, thus enabling the OS to load the pages into physical memory and avoid possible page faults when the data actually arrive.

In other embodiments, upon encountering a page fault in processing a given data packet, the host OS may load into physical memory not only the page containing the presently-requested virtual address, but also other pages to which the I/O device expects to write data from future packets that it has not yet received. This sort of look-ahead page fault avoidance function may be carried out by the I/O device, which then requests that the host OS load the appropriate pages, or by the host OS itself. The I/O device or host OS may predict these future pages, for example, by examining the virtual addresses specified in subsequent work items in the queue of the I/O device (such as WQEs in the receive queue of the device). As another example, when the packet that caused the page fault is the first in a multi-packet message and thus contains the message header, the I/O device may examine the memory range that is specified in the message header and may request that the host OS load all pages in the range. As still another possibility, while handling a packet that caused a page fault, the I/O device may inspect subsequent packets received in its input buffer in order to identify additional pages that will need to be loaded.

Some I/O devices, such as InfiniBand™ (IB) host channel adapters (HCAs) and other NICs with similar capabilities, handle multiple transport service instances concurrently. (The transport service instances can be regarded as parallel communication channels, and are referred to in IB parlance as queue pairs (QPs).) Each QP is associated with a respective host process (or in some cases may be shared among multiple processes) and is used for communicating with a respective node across the IB fabric. In embodiments of the present invention, when a page fault occurs in translating a virtual address in a memory region that is associated with one of the QPs, memory operations associated with that QP may be suspended until the appropriate page has been swapped into physical memory. In the meanwhile, however, other QPs may continue to access the memory without added delay while the page fault is serviced.

In a virtual machine environment, the host operating system may support a virtual machine monitor (VMM), which in turn supports one or more guest operating systems. Applications in both the host domain and the guest domains are able to address and use an I/O interface directly, by interacting with respective QPs, for example. In some embodiments of the present invention, the I/O device performs a dual-level address translation process for virtual memory addresses that are associated with guest domains, as described in the above-mentioned U.S. Pat. No. 8,255,475, for example: First, translation from virtual to "physical" addresses using respective page tables for each guest domain, and then translation from these "physical" addresses to actual machine memory addresses. (The "physical" addresses in this context are regarded by the guest operating systems as real, physical memory addresses, but they are, in fact, virtual addresses at the intermediate stage of address translation. The term "physical address," in the context of the present patent application and in the claims, should thus be understood as including this sort of intermediate virtual address, as well as actual machine addresses.) Page faults may occur at either stage of the address translation process, and the techniques for handling and avoiding page faults that are described herein may be applied at either or both of these stages.

In an alternative embodiment, address translation from virtual addresses in guest domains to machine addresses is performed using a "shadow table," which merges the virtual/ physical and physical/machine translation tables described above. Page faults may similarly occur in address translation by such a shadow table, and the mechanisms of look-ahead page fault avoidance described herein are applicable to this sort of address translation, as well.

For the sake of conceptual clarity, embodiments of the present invention are described herein with reference to an architecture in which data are received by an I/O device, such as a NIC, which is a separate and distinct component from the host processor that is to process the data. The principles of the present invention, however, are not limited to this particular architectural scheme, and may also be implemented in other sorts of system architectures. Specifically, these principles and the techniques in which they are embodied may similarly be applied in closely-integrated I/O architectures, in which the host CPU and I/O device are both integral parts of the same integrated circuit chip. Such alternative embodiments and implementations are all considered to be within the scope of the present invention.

System Description

Figure 1:
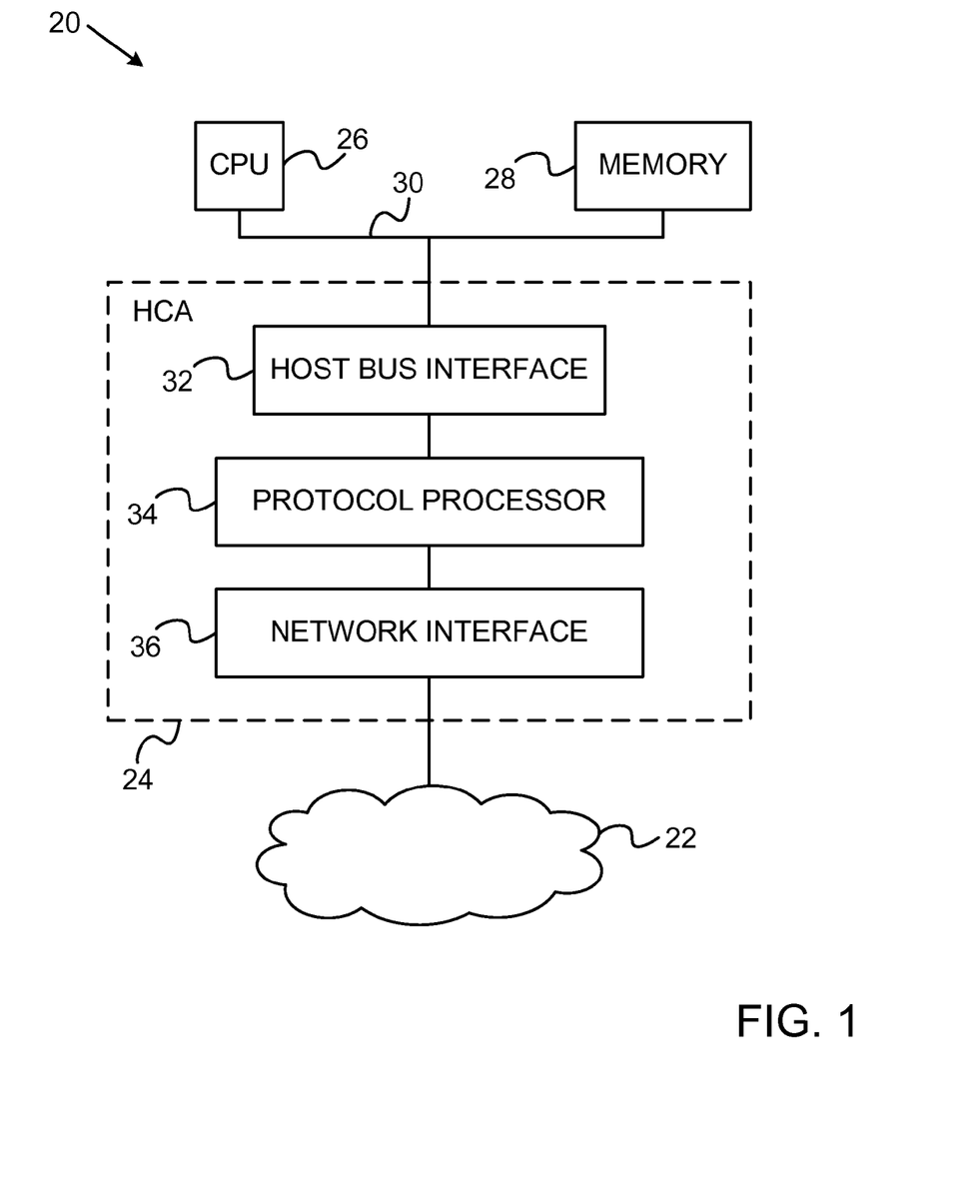
FIG. 1 is a block diagram that schematically illustrates a host computer with a network interface controller (NIC), identified as a host channel adapter (HCA), in accordance with an embodiment of the present invention.

FIG. 1 is a block diagram that schematically shows components of a host computer 20, in accordance with an embodiment of the present invention. Computer 20 comprises an I/O device, such as a NIC—identified as an HCA 24 in this embodiment, for communication with a packet network 22, such as an IB fabric or an Ethernet network, for example. The computer comprises a host processor 26, which is typically a general-purpose central processing unit (CPU), and a system memory 28, connected to the host processor by a host bus 30, under the control of a suitable memory controller (which may be a part of the CPU), as is known in the art. Alternatively, the memory and NIC may be connected to the CPU through optimized, direct interfaces rather than via such a bus. Memory 28 holds program instructions and application data, and may also hold metadata structures that are accessed and used by HCA 24 in managing data transfer operations. (Alternatively, these metadata structures may be stored elsewhere, such as in a dedicated memory within or attached to the HCA.) During operation of computer 20, pages of virtual memory are typically swapped between memory 28 and a mass-storage device, such as a disk (not shown).

HCA 24 is connected to bus 30 by a host bus interface 32, comprising circuitry that enables the HCA to read and write data directly to and from memory 28. Network interface circuitry 36 connects to network 22. Protocol processing circuitry 34 in the HCA performs transport-layer processing functions in accordance with instructions received from host processor 26. These functions include constructing data packets containing data gathered from memory 28 for transmission over network 22, as well as receiving and processing incoming packets from network 22 and scattering the data contained in the packets to memory 28. The functions of the HCA are typically implemented in dedicated hardware circuits, such as those described, for example, in U.S. Pat. No. 8,051,212, whose disclosure is incorporated herein by reference.

Client processes running on computer 20 communicate with the transport layer of network 22 via HCA 24 by manipulating a transport service instance, known as a "queue pair" (QP), which is made up of a send queue and a receive queue. A given client process (referred to hereinafter simply as a "client") may open and use multiple QPs simultaneously. Each QP has a QP context (QPC), which may be held in memory 28. The QPC is used and updated by HCA 24 in the course of processing communications on that QP. Each QP is configured for a certain transport service type, based on how the requesting and responding QPs interact, such as reliable connection, unreliable connection, reliable datagram and unreliable datagram.

To send and receive communications over network 22, the client process initiates work requests (WRs), which causes work items, referred to as work queue elements (WQEs), to be placed in the appropriate queues for execution by the HCA. For any given operation, the QP that initiates the operation, i.e. injects a message into network 22, is referred to as the requester, while the QP that receives the message is referred to as the responder. Request messages include, inter alia, remote direct memory access (RDMA) Write requests, as well as Send requests, which cause the responder to write data to a memory address at its own end of the link, and RDMA Read requests, which cause the responder to read data from a memory address and return it to the requester. RDMA Read and Write requests specify the memory range to be accessed by the HCA in the local memory of the responder, whereas Send requests leave the choice of memory range to the responder.

In the present embodiment, the memory range for at least some request messages is assumed to be specified in terms of virtual memory addresses, which are translated by HCA 24 into physical (machine) addresses in memory 28, as described hereinbelow. For the sake of clarity and simplicity, the following description will relate specifically to certain types of requests using IB vocabulary, but the techniques described hereinbelow are similarly applicable to other types of I/O requests that use virtual memory addresses.

Figure 2:
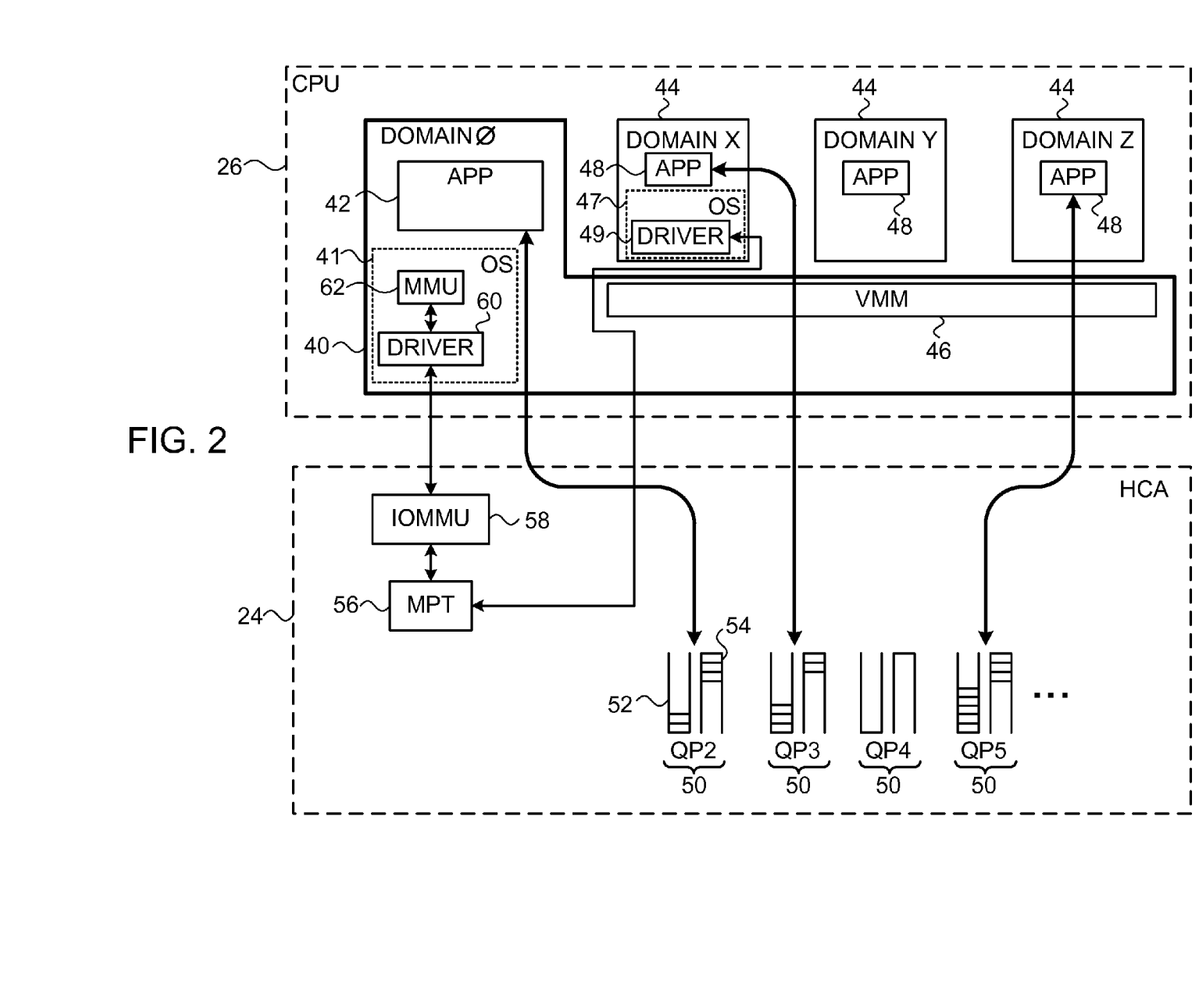
FIG. 2 is a block diagram that schematically shows functional details of interaction between host computer software and a NIC, in accordance with an embodiment of the present invention.

FIG. 2 is a block diagram that schematically shows functional details of interaction between HCA 24 and software running on CPU 26, in accordance with an embodiment of the present invention. The software running on CPU, including both operating system and application programs, may be downloaded to the CPU in electronic form, over a network for example. Additionally or alternatively, the software may be stored on tangible, non-transitory computer-readable media, such as optical, magnetic or electronic memory media.

In this embodiment, computer 20 may support a virtual machine environment, in which HCA 24 performs a two-stage address translation process, as described, for example, in the above-mentioned U.S. Pat. No. 8,255,475. Aspects of the address translation techniques that are described herein, and particularly the methods of avoiding page faults and handling them when they occur, are likewise applicable to computers running only a single, host operating system, as will be apparent to those skilled in the art.

CPU 26 operates a host domain 40 (referred to in the figure as DOMAIN 0), with a host operating system 41, which supports host user applications 42. In addition, the CPU may concurrently run one or more virtual machines (labeled DOMAIN X, DOMAIN Y, DOMAIN Z, . . . ), each with its own guest operating system 47 and guest user applications 48. (Only one guest OS is shown in FIG. 2 for the sake of simplicity; furthermore, in some implementations, applications may run exclusively in the guest domains or exclusively in the host domain.) A virtual machine monitor (VMM) 46 in the host domain, also referred to as a hypervisor, interacts with the kernels of the guest operating systems in a manner that emulates the host processor and allows the virtual machines to share the resources of the CPU. A wide range of virtual machine software of this sort is available commercially, and further description is beyond the scope of the present invention.

For efficient use of HCA resources, both host domain 40 and virtual machines 44 are able to interact directly with the HCA, rather than passing commands and data through the host domain. Thus, as shown in FIG. 2, each application 42, 48 may be assigned one or more queue pairs 50 (labeled QP2, QP3, . . . , in the figure), comprising a send queue 52 and a receive queue 54, as explained above. Furthermore, each virtual machine may post control and configuration commands to the HCA via a respective command queue (not shown). In other words, the HCA appears to each virtual machine to be a dedicated I/O device for use by that virtual machine. This configuration minimizes the burden on VMM 46 and on the host operating system.

Using the respective QPs 50, each virtual machine 44 is able to execute data flow operations directly between HCA 24 and memory 28. For this purpose, a HCA driver 49 in each virtual machine 44 (only one such driver is shown for simplicity) assigns memory protection keys and virtual address spaces for use by the respective QPs. The driver loads the keys and address translation tables into a memory protection and translation (MPT) unit 56, for use by the HCA in servicing work items in the QP. A HCA driver 60 in host domain 40 loads keys and address translation tables for use by host applications 42.

The address translation tables loaded into MPT unit by the HCA drivers convert virtual addresses into physical addresses. In the case of driver 60 of the host domain, the physical addresses are actual machine addresses in memory 28. For virtual machines 44, however, these "physical addresses" are actually just another level of virtual addresses, defined in the virtual address space that is allocated to each virtual machine. The "physical addresses" in the virtual machine address spaces are translated by an I/O memory management unit (IOMMU) 58 into actual machine addresses in memory 28, which are used in writing to and reading from the memory via bus 30. Driver 60 loads the required address translation tables into IOMMU 58, based on the virtual memory spaces that have been assigned to each of the virtual machines. Details of this address translation process are described in the above-mentioned U.S. Pat. No. 8,255,475.

For the sake of conceptual clarity, MPT unit 56 and IOMMU 58 are shown in FIG. 2 as separate entities. In practice, however, these two entities may be combined into a unified set of translation and protection tables. The configuration shown in FIG. 2, however, is advantageous in conserving system resources and enhancing the flexibility of the HCA. Alternatively, the functions of the IOMMU may be carried out by a separate unit, which may even be located outside HCA 24 on bus 30, in which case the HCA may keep its own cache of address translation data.

As noted earlier, the virtual memory space that is allocated in computer 20 to virtual machines 44 and to applications 42, 48 may exceed the actual amount of space available in memory 28. This sort of oversubscription may occur both in the allocation of memory to the virtual machines and in the allocation of this "virtual physical" memory among applications 48. A memory management unit (MMU) 62 therefore detects page faults and may instruct the operating system to swap pages of data into memory 28 when they are needed and out to mass storage (such as to disk) when they are not. When HCA 24 encounters a page fault in MPT unit 56 or IOMMU 58, it informs driver 49 or 60, which may then update the appropriate table. If necessary, the driver instructs the operating system to swap the required page into memory 28. Details of handling of page faults are described hereinbelow with reference to FIGS. 3 and 4.

Page Fault Handling and Avoidance

Look-Ahead Page Fault Prevention by a NIC

Figure 3:
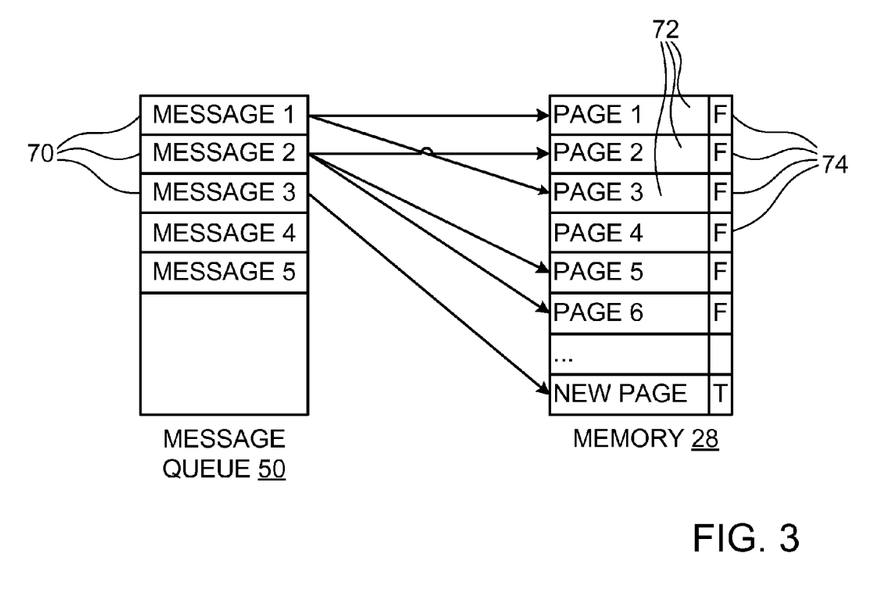
FIG. 3 is a block diagram that schematically illustrates association between incoming messages and memory pages, in accordance with an embodiment of the present invention.

FIG. 3 is a block diagram that schematically illustrates association between incoming messages 70 and memory pages 72, in accordance with an embodiment of the present invention. Each message 70 arrives from network 22 in the form of one or more data packets. When a NIC, such as HCA 24, receives a data packet for processing, it checks the message queue to which the packet belongs (i.e., it checks the appropriate QP 50, in the implementation described above). The queue contains information regarding the message, including the virtual memory address range to which the data payload of the packet is to be written. Alternatively or additionally, the HCA may extract virtual address information from the headers of the data packets themselves. As explained earlier, if the virtual memory page containing the address to which the payload is to be written is swapped out of physical memory, HCA 24 generates a page fault event.

Messages sent to and from applications 42, 48 over network 22 commonly contain large volumes of data, which may be spread over a number of packets and may be written to multiple different pages in the virtual memory of the target computer. Therefore, in servicing the page fault triggered by the first incoming data packet in a given message, driver 49 or 60 (as appropriate) may read information from the message queue to find not only the page needed for the data in the first packet, but also to determine what further pages 72 may be required for subsequent packets in the current message. For example, incoming IB Send messages consume WQEs from receive queue 54, which indicate the virtual memory addresses to which the data in these message should be written. The driver can identify the memory pages that will be required by reading these WQEs. Alternatively or additionally, the HCA and/or the driver may look ahead in the receive queue to identify and pre-load required memory pages without even waiting for a page fault.

Thus, in the example shown in FIG. 3, "Message 1" contains data to be written to both "page 1" and "page 3" of virtual memory. The initial packet in this example is assumed to contain data to be written to page 1. When the driver checks the information in message queue 50 (and/or in the initial packet itself), however, it determines that later data in the same message will be written to page 3. The driver therefore instructs the operating system to load both page 1 and page 3 into the host memory, despite the fact that the data to be written to page 3 have not yet been received at HCA 24, because data are expected to be written imminently to page 3 in this same message, i.e., as part of the same I/O operation.

By the same token, upon receiving the first packet in Message 2, the driver will examine the message queue and/or the packet and will determine that this message will require pages 2, 5 and 6 to be loaded into host memory 28. The driver may then request that some or all of these pages be loaded in response to the first page fault in the message. There is no requirement that the virtual memory addresses specified in this or other messages be page-aligned; rather, the driver uses the base address and data length of the message to determine the pages to which all of the data in the message are to be written, and asks to load the appropriate pages.

In this manner, future page faults can be avoided with respect to packets that have not yet arrived and memory pages that are not yet actually required. This approach can be useful in reducing the burden on the operating system and reducing the number of transactions on bus 30, and particularly in reducing the latency of packet handling by HCA 24. As mentioned earlier, this sort of look-ahead page fault avoidance can be implemented in different ways for different message types, either in response to a page fault that occurs in processing one of the packets of a message or even without waiting for the page fault to occur:

- Incoming Send messages—The first packet received by HCA 24 in a given message identifies the QP and the length of the message. The WQEs in the receive queue of the QP indicate the virtual memory addresses to which the message data will be written and hence the pages that may need to be loaded.
- Incoming RDMA Write messages—The first packet of an RDMA write message typically contains a base address in virtual memory and the total length of the message. Upon receiving this first packet, HCA 24 can request not only the page that will be needed for the data in the current packet, but also the pages for the entire message, thus preventing possible page faults for the other packets of this message.
- Outgoing RDMA Read responses—As in the case of RDMA Write, each incoming RDMA Read request will indicate the virtual address and the total length of the requested data. HCA 24 can then prefetch this entire memory region in order to prevent page faults when sending the RDMA Read responses. As in the case of RDMA Write, this sort of prefetching can be requested in all cases or only when a page fault is encountered in sending one of the RDMA Read responses. While servicing RDMA Read page faults of this kind, the HCA can continue accepting request packets targeted to the same QP (although it cannot yet acknowledge them to the requester).
- Incoming RDMA Read responses—The RDMA Read initiator may encounter a page fault upon receiving requested data from the responder and attempting to write it to memory 28. To avoid or reduce this sort of occurrence, HCA 24 or driver 49 or 60 may request that the memory region for the RDMA Read operation be prefetched upon posting the outgoing RDMA read request to send queue 52, or upon encountering the first page fault in processing the incoming RDMA Read response.

In an alternative embodiment, HCA 24 may predict and request pre-loading of virtual memory pages by checking the headers of packets held in the input buffer of the HCA (which may be located either in the HCA itself or in memory 28), before actually processing the packet data. Thus, for example, upon detecting a page fault and generating a page fault event while processing the data in a first packet, the HCA may examine subsequent packets in its buffer, before actually processing the data contained in these packets, in order to identify future potential page faults. Upon identifying a second packet directed to a second virtual memory page that is also swapped out, the HCA may request that the operating system swap both the first and second pages into the host memory. Thereafter, the HCA will be able to write the data from both the first and second packets to the respective virtual pages without engendering a second page fault.

Page Fault Prevention at the Application Level

In addition to or alternatively to the above methods, operating system 41 and/or 47 may be configured to allow prefetching of memory pages at the request of user applications 42, 48. This sort of functionality is useful, for example, in cases in which application 42 or 48 expects to receive incoming messages (Send or RDMA) at certain points in its execution. For instance, the application may send a message and expect a reply message containing data soon afterwards. In such circumstances, page faults can be avoided by allowing the application to initiate prefetching of some pages.

For this purpose, in an embodiment of the present invention, the operating system is extended by adding an application program interface (API) call (or equivalently, a "verb") that can be used by applications to request that the operating system prefetch a certain virtual memory range and map it for use by HCA 24. The call is typically handled by driver 49 and/or 60, which then asks the operating system to load the specified pages and passes their mapping to the HCA.

In this manner, the application can request, in advance, an allocation of memory to be used in receiving data in a message that is to be transmitted over network 22 to host computer 20 but has not yet been received by the host computer. Typically, the application programmer will insert this sort of call in an application program proximate to (either shortly before or shortly after) a command issued by the application to perform an I/O operation, such as a command to send a message to another node that is expected to invoke a reply that will contain data. Alternatively or additionally, a driver program running in user space may detect that an application has added a WQE, containing a virtual address, to the receive queue, and may submit such a call automatically. In expectation of receiving the data, the operating system on the computer will then prefetch (load and map) the memory pages that will be needed to avoid a page fault.

It can also be helpful in this context for an application to be able to ascertain whether a given virtual page is already mapped, or whether an attempt to write data to the virtual page will cause a page fault. The above-mentioned API may include a method that the application can use to query the operating system about a page or a virtual memory range (in a manner that allows the application to perform the query efficiently, without having to actually execute OS code). In this case, the application may initiate prefetching only if it is needed.

Additionally or alternatively, the application may set (or reset) a flag 74 to mark pages that it no longer needs, because it has already read and processed the data on the page, for example. (Although for the sake of simplicity, each flag 74 is appended to the corresponding page 72 in FIG. 3, in practice these flags may be held in a separate data structure, so that applications can set and reset the flags without involving the OS kernel.) Marking a page in this manner indicates to the operating system that there is no need to load data from the disk to host memory 28 when the page in question is swapped in, since the data are no longer needed by the application and can simply be overwritten by a subsequent incoming message.

This sort of marking may be used to advantage in conjunction with handling of incoming messages by HCA 24, as illustrated by the handling of "Message 3" in FIG. 3: When the HCA detects a page fault upon receiving this message, it may ask the operating system to allocate a new page of physical memory, rather than loading the page that is currently mapped to the virtual address to which the message data are to be written. The operating system may maintain a pool of physical pages that are available for this purpose (i.e., pages that are blank or can otherwise be overwritten since the data they contain are no longer needed) and may in this case select one of these physical pages for use by the HCA. The operating system and HCA, in other words, treat this new page as a free (blank) page. Alternatively, the HCA itself may select a suitable blank page that has been pre-allocated for this purpose.

After the HCA has written the received data to this free page in the host memory, it may set (or reset) flag to indicate that the page now contains valid data. The HCA then signals the MMU and/or the OS to remap the virtual address specified in the message from the physical page to which it was mapped previously to the physical address of this free page to which the data have now been written.

As noted earlier, the techniques of page fault prevention that are described above may be applied in the sort of virtual machine environment that is illustrated in FIG. 2 at both the virtual/physical and physical/machine levels of address translation. For example, when the hypervisor (VMM 46 in FIG. 2) receives notification of a page fault, it may allocate a new page and map it to the requested physical page as described above, rather than swapping the page in from disk. HCA (or any other I/O device operating in this sort of environment) may add a hint to its bus transactions to indicate that a new page can be allocated to receive incoming data. IOMMU 58 may pass the hint to VMM 46, which then allocates a new page accordingly, or the IOMMU may itself maintain a pool of pages that can be allocated for this purpose.

Packet Processing Scenario

Figure 4:
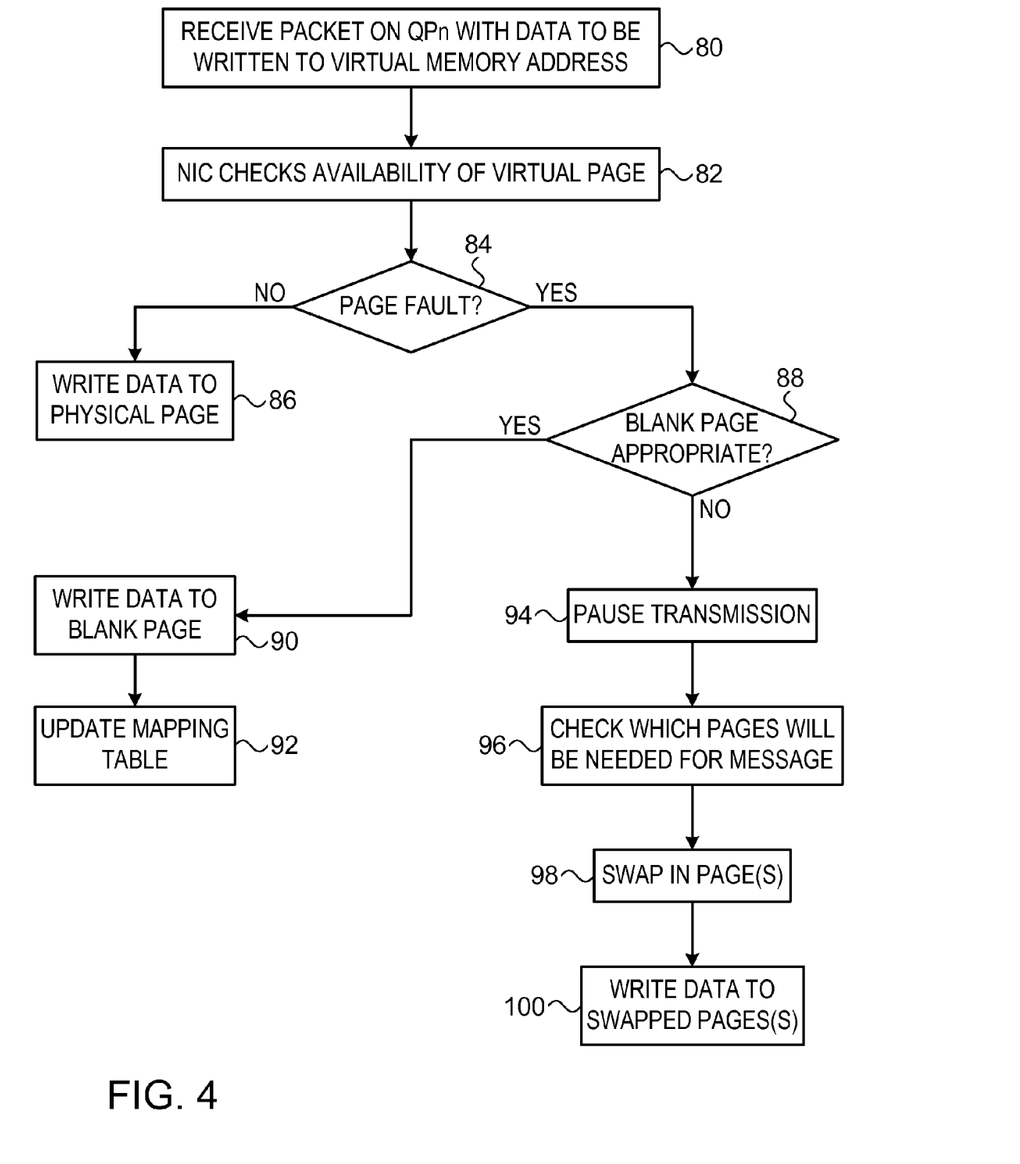
FIG. 4 is a flow chart that schematically illustrates a method of I/O memory access, in accordance with an embodiment of the present invention.

FIG. 4 is a flow chart that schematically illustrates a method of I/O memory access that uses some of the techniques described above, in accordance with an embodiment of the present invention. The method is initiated when a NIC, such as HCA 24, receives an incoming data packet from network 22, at a packet reception step 80. The packet header indicates the QP number (QPn) of the message (or equivalently, the "ring") to which the packet belongs. The NIC identifies the virtual address in host memory to which the data in the packet are to be written, based, for example, on information in the message queue and/or in the packet itself, as explained above.

The NIC translates the virtual address to the corresponding physical address, and checks whether the page containing this address is present in host memory 28 (using MPT unit 56, for example), at a page checking step 82. If the desired page is not present in the memory, the NIC generates a page fault event, at a page fault step 84. If there is no page fault, however, the NIC simply proceeds to write the packet data to the appropriate physical page in the memory, at a data writing step 86.

If a page fault does occur at step 84, the NIC may check whether there a blank page of memory may be used to accept the packet data, at a blank page checking step 88. If the use of a blank page to receive the data is appropriate, as explained above, and a blank page is available, the NIC writes the packet data to this page, at a blank page writing step 90, rather than waiting for the physical page that was previously mapped to the desired virtual address to be loaded from disk. (If a blank page is not available, it is possible for the NIC to pause communications on this QP and wait for the OS to allocate a blank page.) After writing the data to this blank page, the NIC signals the operating system, which then updates its memory mapping table, at a mapping update step 92, to map the page that now contains the data to the virtual page containing the virtual address that was identified at step 80.

On the other hand, if there was no blank page available at step 88, or if the data transfer operation in question is such that use of a blank page is inappropriate, the NIC pauses communications on the QP to which the message belongs while handling the page fault, at a transmission suspension step 94. (It may be inappropriate to use a blank page, for instance, when the NIC has already written data to a part of the page in question from a previous packet, and the present packet contains further data to be written to the same page.) The NIC may suspend transmission, for example, by discarding the data packet that it received at step 80 and sending a negative acknowledgment, such as a RNR NAK packet, to the sender of the packet, as described in the above-mentioned U.S. Pat. No. 8,255,475.

While transmission is paused, the NIC checks the appropriate message queue and/or the header of the discarded packet and possibly other packets in its input buffer, as explained above, in order to identify the memory pages that will be needed to receive packet data on this QP, at a lookahead page checking step 96. At this step, the NIC may identify not only the page to which the data in this first packet are to be written, but also pages to which data in future packets are expected to be written. The NIC then requests that the operating system of computer 20 swap all of these pages into memory 28, at a memory swapping step 98. Alternatively, when the NIC reports a page fault, the operating system itself may check the appropriate queue of the NIC in order to identify the additional memory pages that should be swapped in.

Subsequently, the packet sender will retransmit the original data packet (which the NIC discarded at step 94), followed by subsequent packets on the same QP, possibly as part of the same multi-packet message. Upon receiving these packets, the NIC writes the packet data to the pages that have now been swapped in, at a data writing step 100. As a result, no more than a single page fault is typically encountered in any given message, even when the message data span multiple pages.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data transfer, comprising:
   receiving, by a processor, in an input/output (I/O) operation a first segment of data to be written to a specified virtual address in a host memory;
   detecting, upon receiving the first segment of the data, that a first page that contains the specified virtual address is swapped out of the host memory on a mass-storage device;
   identifying, by the processor, at least one second page of the host memory to which a second segment of the data is expected in the future to be written, before the second segment is processed by the processor;
   responsively to detecting that the first page is swapped out and to identifying the at least one second page, swapping at least the first and second pages into the host memory together, from the mass-storage device; and
   after swapping at least the first and second pages into the host memory, writing the data to the first and second pages.

2. The method according to claim 1, wherein receiving the first segment of the data comprises receiving the first and the second data packets over a network.

3. The method according to claim 1, wherein detecting that the first page is swapped out comprises generating a page fault event, wherein at least the first and second pages are swapped into the host memory in response to the page fault event.

4. The method according to claim 3, and comprising pausing the I/O operation in response to the page fault event, until at least the first page has been swapped into the host memory.

5. The method according to claim 1, wherein the I/O operation comprises a message directed to a message queue in the host memory, and wherein identifying the at least one second page comprises applying information from the message queue in identifying the at least one second page.

6. The method according to claim 1, wherein identifying the at least one second page of the host memory comprises receiving an indication, by an operating system, from a user application.

7. The method according to claim 1, wherein identifying the at least one second page of the host memory comprises examining a message header of a first packet of a multi-packet message received by a network interface controller (NIC) storing the message in the host memory.

8. The method according to claim 1, wherein identifying the at least one second page of the host memory comprises examining subsequent packets of a multi-packet message in which the first segment of data was received.

9. The method according to claim 1, wherein identifying the at least one second page of the host memory comprises identifying at least one page in which further data in packets of a multi-packet message in which the first segment of data was received, is to be stored.

10. The method according to claim 1, wherein identifying the at least one second page of the host memory comprises examining a receive queue of a network interface controller (NIC).

11. The method according to claim 1, wherein identifying the at least one second page of the host memory comprises performing the identification upon detecting a page fault.

12. The method according to claim 1, wherein identifying the at least one second page is performed before the second segment arrives at the processor.

13. A method for data transfer, comprising:
receiving multiple data packets in a network interface controller (NIC) coupled to a host processor, the data packets including at least first and second packets respectively containing first and second data directed to respective first and second virtual addresses in a memory of the host processor;
while processing the first data in the NIC and before processing the second data from the second packet, detecting that a first page containing the first virtual address and a second page containing the second virtual address are swapped out of the memory on a mass-storage device;
responsively to detecting that the first and second pages are swapped out of the memory, swapping both the first and second pages into the host memory together, from the mass-storage device, before processing the second data from the second packet; and
after swapping the first and second pages into the host memory, writing the first and second data to the first and second pages.

14. The method according to claim 13, wherein detecting that the first page is swapped out comprises generating a page fault event, wherein at least the first and second pages are swapped into the host memory in response to the page fault event.

15. The method according to claim 13, wherein the first and second data packets contain respective parts of a message directed to a message queue of the NIC, and wherein detecting that the second page is swapped out of the memory comprises applying information from the message queue in identifying the second page.

16. The method according to claim 15, wherein applying the information from the message queue comprises reading virtual address information from work items in a receive queue of the NIC.

17. The method according to claim 13, wherein the first and second data packets contain respective parts of a remote direct memory access (RDMA) message, and wherein detecting that the second page is swapped out of the memory comprises reading a header of the RDMA message from the first packet in order to identify both the first and second pages.

18. The method according to claim 13, wherein receiving the multiple data packets comprises placing at least the first and second packets in an input buffer of the NIC, and wherein detecting that the second page containing the second virtual address is swapped out of the memory comprises processing a header of the second packet in the input buffer in order to identify the second virtual address.

19. Input/output (I/O) apparatus, comprising:
a host interface for connection to a host processor having a host memory and running an operating system; and
processing circuitry, which is configured to receive in an I/O operation a first segment of data to be written to a specified virtual address in the host memory, to detect, upon receiving the first segment of the data, that a first page that contains the specified virtual address is swapped out of the host memory on a mass-storage device, to identify at least one second page of the host memory to which a second segment of the data is expected in the future to be written, before the second segment is processed, and responsively to detecting that the first page is swapped out and to identifying the at least one second page, to cause the operating system to swap at least the first and second pages into the host memory together, from the mass-storage device, and after at least the first and second pages have been swapped into the host memory, to write the data to the first and second pages.

20. The apparatus according to claim 19, and comprising a network interface, which is configured to receive first and second data packets containing the first and second segments of the data over a network.

21. The apparatus according to claim 19, wherein the processing circuitry is configured, upon detecting that the first page is swapped out, to generate a page fault event, wherein at least the first and second pages are swapped into the host memory in response to the page fault event.

22. The apparatus according to claim 21, wherein the processing circuitry is configured to pause the I/O operation in response to the page fault event, until at least the first page has been swapped into the host memory.

23. The apparatus according to claim 19, wherein the I/O operation comprises a message directed to a message queue in the host memory, and wherein the processing circuitry is configured to apply information from the message queue in identifying the at least one second page.

24. A network interface controller (NIC), comprising:
a host interface for connection to a host processor having a host memory and running an operating system;
a network interface configured to receive multiple data packets from a network, including at least first and second packets respectively containing first and second data directed to respective first and second virtual addresses in the host memory; and
processing circuitry, which is configured to process the data packets so as to detect, while processing the first data from the first packet and before processing the second data from the second packet, that a first page containing the first virtual address and a second page containing the second virtual address are swapped out of the memory on a mass-storage device, wherein the processing circuitry is configured, responsively to detecting that the first and second pages are swapped out of the memory and before processing the second data from the second packet, to cause the operating system to swap both the first and second pages into the host memory together, from the mass-storage device, and to write the first and second data to the first and second pages after the first and second pages have been swapped into the host memory.

25. The apparatus according to claim 24, wherein the processing circuitry is configured, upon detecting that the first page is swapped out, to generate a page fault event, wherein at least the first and second pages are swapped into the host memory in response to the page fault event.

26. The apparatus according to claim 24, wherein the first and second data packets contain respective parts of a message directed to a message queue of the NIC, and wherein the processing circuitry is configured to read and apply information from the message queue in identifying the second page.

27. The apparatus according to claim 26, wherein the information read from the message queue by the processing circuitry comprises virtual address information read from work items in a receive queue of the NIC.

28. The apparatus according to claim 24, wherein the first and second data packets contain respective parts of a remote direct memory access (RDMA) message, and wherein the processing circuitry is configured to read a header of the RDMA message from the first packet in order to identify both the first and second pages.

29. The apparatus according to claim 24, wherein the network interface is configured to place at least the first and second packets in an input buffer of the NIC, and wherein the processing circuitry is configured to read a header of the second packet in the input buffer in order to identify the second virtual address.

* * * * *